June 25, 1929.   W. F. BLEECKER   1,718,627
COMPOSITE MATERIAL
Filed March 22, 1924

INVENTOR.
W. F. Bleecker;
BY
ATTORNEY.

Patented June 25, 1929.

1,718,627

UNITED STATES PATENT OFFICE.

WARREN F. BLEECKER, OF BOULDER, COLORADO.

COMPOSITE MATERIAL.

Application filed March 22, 1924. Serial No. 701,226.

My invention relates to conduits or other machine parts adapted for the conveyance and treatment of liquids and gases and an object of the invention is to provide a device of the above described character which is formed of an impervious and chemically-resistant composite substance preferably reenforced by internally or externally applied members of metal, fiber or other rigid and wear-resisting material.

Another object of the invention resides in forming the composite substance to the desired shape inside of a casing made of metal or other wear-resisting material; a further object is to produce cylindrical conduits of a composite substance of the above described character, applied in a fluid or plastic state in a metal or fibre tube and hardened in place, and still another object is to provide in a conduit thus constructed, flanges at the ends of the outer casing, and gaskets upon the flanges, which are formed integrally of the inner composite lining, and which in a sectional conduit function to produce a water-tight joint between the members thereof and to prevent a fluid passing through the conduit from coming in contact with its metal part or parts.

A conduit or other machine part thus constructed is proof against the formation of incrustations caused by oxidation and corrosion, and against the destructive and deteriorative influences of chemical gases and liquids and its casing functions as a pressure-resisting armor which protects the more breakable composite material from the demolishing effect of exterior influences.

Figure 1:
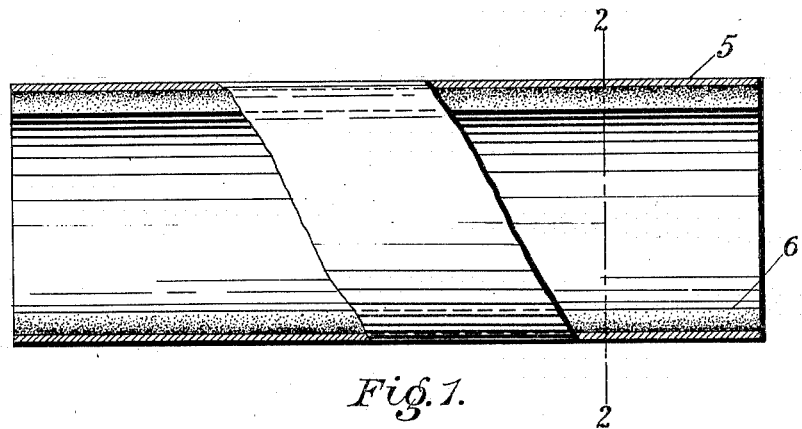
Figure 2:
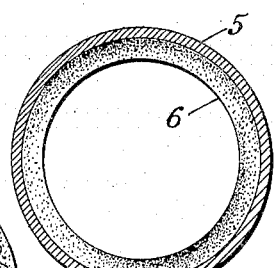
Figure 3:
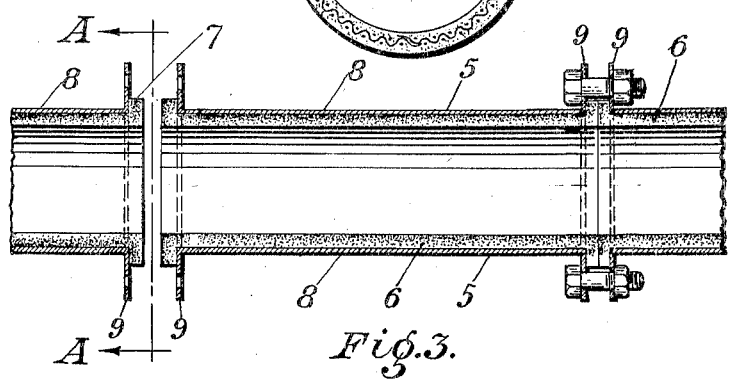

In the drawings in the several views of which like parts are similarly designated, Figure 1 represents a sectional elevation of a conduit made in accordance with my invention;

Figure 2, a section taken on the line 2—2, Figure 1;

Figure 3, a longitudinal section of a sectional conduit of the improved construction, showing a plurality of the flanged sections of which it is composed, in interconnected and separated relation.

Figure 4:
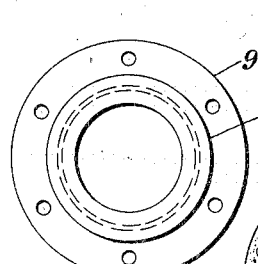
Figure 5:
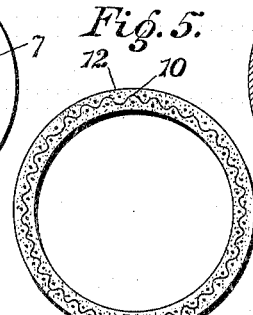

Figure 4, an end view of one of the sections shown in Figure 3, looking in the direction of the arrow A; and Figure 5, a transverse section of a conduit having a reenforcement inside of the composite material of which it is produced.

The composite substance used in the production of conduits or other machine parts in accordance with my invention, consists of two or more chemically-resistant substances, one or more of which are non-coherent and one or more of which are fusible.

The substances are intermixed to a point of saturation of the non-coherent mass with the fusible matter in a fluid condition, or so that every void and interstice of the first mentioned substance is completely filled with the other. When the compound thus prepared, is hardened by cooling of its fusible ingredient, it is fully proof against the corrosive influence of fluids owing to the fact that all of its ingredients are chemically-resistant, and it is at the same time completely impervious to both gases and liquids because of its being devoid of any crevices or pores into which such fluids can enter.

The chemically-resistant non-coherent substance used in the composition may be graphite, coke or other carbonaceous matter either by itself or in intermixture with cheaper and easier obtained material such as sand or clay.

The last mentioned substances can also be used without a carbonaceous ingredient but for the purpose of the present invention, it is better that either graphite or coke be present in the composition.

The preferred fusible constituent of the composition is sulfur but pitch or other similar material may under certain conditions, be used with satisfactory results.

In constructing a machine part in accordance with my invention, the composition is made by thoroughly intermixing its non-coherent constituent in a comminuted condition with the fusible substance in a molten condition, to a point of complete saturation. The mixture in a fluid or semi-fluid state is then molded upon the inner surface of a metal casing of the desired form, in a body of substantially uniform thickness and is subsequently allowed to harden by congealment of its fusible constituent.

In the example illustrated in Figures 1 and 2 of the drawings, a composite lining 6 of the above described character is formed in a fluid state inside of a cylindrical casing 7, and hardened in place, and in the form shown in Figure 5, a rigid reenforcement 10 preferably made of woven wire is embedded in a cylinder 12 composed of the composite material.

In the production of a conduit composed of flanged, end-to-end adjoining sections 8 as illustrated in Figures 3 and 4, the latter are separated by gaskets 7 formed on the faces of flanges 9 on the outer casing within the circle of their bolt holes and in integral connection with the composite body 6 on the inside of the casing.

The gaskets may be formed by means of molds applied at the ends of the sections or in any other convenient and practical manner, it being understood that, as mentioned hereinbefore, the method of producing the conduits or other machine parts is not a part of the present invention.

It will be apparent that by the use of my invention any machine part employed in the treatment or conveyance of liquids and gases, in which both imperviousness and resistance to the corrosive action of acids and chemicals are essential, may be readily formed and produced.

As a modification of the above described method of forming the composite body within a protective casing, artificial graphite or other similar material applied to the casing in any suitable way, may be impregnated with the fusible substance in a molten state, by pressure or other method which will cause the liquid matter to enter into every void and interstice of the non-coherent material.

It will be evident that machine parts composed as hereinabove described, can be used for an indefinite period without deterioration owing to the fact that the conveyed gases or liquids do not come in contact with parts which are subject to corrosive action.

The imperviousness of the inner or body part of the article prevents the penetration and retention of the fluids, and its chemically-resistant property adapts the article for use in factories and laboratories where the materials under treatment are acidiferous.

Having thus described my invention, what I claim and desire to secure by Letters Patent is:

1. As a new article of manufacture, a solid impervious and chemically-resistant composite body composed of graphite and a fusible chemically-resistant substance mixed to a point of saturation of the mass.

2. As a new article of manufacture, a conduit having an impervious and chemically resistant body composed of a non-coherent material and a fusible chemically-resistant substance mixed to a point of saturation of the mass, said body having an integral gasket at an end thereof, and a surrounding reenforcing casing having a flange of larger diameter than the gasket against the inner surface thereof and spaced from the end of the conduit whereby an impervious and chemically resistant spacing thickness is provided between the flange and an object to which the reenforced conduit is applied.

3. A machine part comprising a body element composed of a non-coherent chemically-resistant substance, and a fusible chemically-resistant substance mixed to a point of saturation of the mass, said body element being reenforced by a surrounding casing of comparatively thin metal.

4. As a new article of manufacture, a conduit having an impervious and chemically resistant body composed of a non-coherent material and a fusible chemically-resistant substance mixed to a point of saturation of the mass, said body having an integral gasket at an end, and a surrounding reenforcing casing extending to the gasket and having a flange bearing against the gasket and spaced from the end of the conduit by the thickness of the gasket.

In testimony whereof I have affixed my signature.

WARREN F. BLEECKER.